(12) United States Patent
Kanokogi et al.

(10) Patent No.: US 10,564,617 B2
(45) Date of Patent: Feb. 18, 2020

(54) PLANT CONTROL DEVICE, PLANT CONTROL METHOD, AND RECORDING MEDIUM

(71) Applicant: Yokogawa Electric Corporation, Musashino-shi, Tokyo (JP)

(72) Inventors: Hiroaki Kanokogi, Tokyo (JP); Go Takami, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 342 days.

(21) Appl. No.: 15/686,354

(22) Filed: Aug. 25, 2017

(65) Prior Publication Data

US 2018/0095436 A1    Apr. 5, 2018

(30) Foreign Application Priority Data

Aug. 31, 2016  (JP) .................................. 2016-169936

(51) Int. Cl.
*G05B 19/048*    (2006.01)
*G06F 11/07*    (2006.01)

(52) U.S. Cl.
CPC ........ *G05B 19/048* (2013.01); *G06F 11/0703* (2013.01)

(58) Field of Classification Search
None
See application file for complete search history.

(56) References Cited

U.S. PATENT DOCUMENTS

| | | |
|---|---|---|
| 2009/0063115 A1 | 3/2009 | Lu et al. |
| 2009/0089227 A1 | 4/2009 | Sturrock et al. |
| 2009/0198350 A1* | 8/2009 | Thiele .................. G05B 13/042 700/30 |
| 2014/0257526 A1* | 9/2014 | Tiwari .................. G05B 13/02 700/29 |

FOREIGN PATENT DOCUMENTS

| | | |
|---|---|---|
| JP | 2014-174993 A | 9/2014 |
| JP | 2015-530652 A | 10/2015 |
| WO | 2014/031264 A2 | 2/2014 |

* cited by examiner

*Primary Examiner* — Ziaul Karim
(74) *Attorney, Agent, or Firm* — Sughrue Mion, PLLC

(57) ABSTRACT

A plant control device of the present invention includes a register configured to register a simulated dangerous condition which is a simulated representation of an operation condition under which a plant is dangerous, a first acquirer configured to acquire an operation condition of the plant, a learner configured to learn the operation condition acquired and the simulated dangerous condition registered and produce an operation model of the plant, a determiner configured to determine an operation parameter of the plant on the basis of the operation condition acquired and the operation model produced, and an instructor configured to instruct an operation of the plant on the basis of the operation parameter determined.

14 Claims, 6 Drawing Sheets

FIG. 4

| SIMULATED DANGEROUS CONDITION | NUMERICAL VALUE INDEX | | | | | | | | |
|---|---|---|---|---|---|---|---|---|---|
| | S1 | V1 | S2 | S3 | S4 | V2 | S5 | S6 | V3 |
| KJ1 | a11 | a12 | a13 | a14 | a15 | a16 | a17 | a18 | a19 |
| KJ2 | a21 | a22 | a23 | a24 | a25 | a26 | a27 | a28 | a29 |
| KJ3 | a31 | a32 | a33 | a34 | a35 | a36 | a37 | a38 | a39 |
| ... | ... | ... | ... | ... | ... | ... | ... | ... | ... |

FIG. 5

| ACQUISITION TIME | S1 | V1 | S2 | S3 | S4 | V2 | S5 | S6 | V3 | SIMULATED DANGEROUS CONDITION ADDITION |
|---|---|---|---|---|---|---|---|---|---|---|
| 2016/10/10 10:20:00 | c11 | c12 | c13 | c14 | c15 | c16 | c17 | c18 | c19 | − |
| 2016/10/10 10:21:00 | c21 | c22 | c23 | c24 | c25 | c26 | c27 | c28 | c29 | − |
| 2016/10/10 10:22:00 | c31 | c32 | c33 | c34 | c35 | c36 | c37 | c38 | c39 | A |
| 2016/10/10 10:23:00 | c41 | c42 | c43 | c44 | c45 | c46 | c47 | c48 | c49 | C |
| 2016/10/10 10:24:00 | c51 | c52 | c53 | c54 | c55 | c56 | c57 | c58 | c59 | − |
| ... | ... | ... | ... | ... | ... | ... | ... | ... | ... | ... |

PLANT CONTROL DEVICE, PLANT CONTROL METHOD, AND RECORDING MEDIUM

BACKGROUND OF THE INVENTION

Field of the Invention

The present invention relates to a plant control device, a plant control method, and a recording medium.

The present application claims priority based on Japanese patent application 2016-169936, filed on Aug. 31, 2016 and includes herein by reference the content thereof.

Description of Related Art

In the related art, in industrial plants such as chemical plants, plants which manage and control well sites such as gas wells and oil wells and the vicinity thereof, plants which manage and control hydraulic power generation, thermal power generation, nuclear power generation, and the like, plants which manage and control environmental power generation such as solar power generation and wind power generation, and plants which manage and control water supply and sewage, dams, and the like and factories, and the like (hereinafter collectively referred to as a "plant"), a distributed control system (DCS) in which a site unit such as measuring units or an operating unit referred to as a field device and a control device configured to control these are connected with communication means is constructed and an advanced automatic operation is realized.

In systems and the like of plants constructed to realize the above-described advanced automatic operation, observers referred to as board operators monitor operation states of the plants. Operation states such as yield, operating condition, and alarm occurrence states of the plants are measured using measuring units such as sensors, collected with a DCS, and displayed on monitoring devices such as monitors of operation panels and monitoring terminals. When the board operators recognize an abnormality in the plants with the monitoring devices or when the yield of the plants is increased or decreased, and the like, the operators referred to as the field operators are instructed to investigate, inspect, or exchange devices or are instructed to adjust operating units such as valves.

Also, there is a system in which information is provided to an operator using artificial intelligence using a determination model using input information of a sensor and the like when a plant is controlled (for example, refer to Japanese Unexamined Patent Application, First Publication No. 2014-174993 and Published Japanese Translation No. 2015-530652 of the PCT International Publication).

The costs such as personnel expenses are required and a man-made mistake occurs in some cases when a plant is operated using a board operator and a field operator.

Also, in a system using artificial intelligence, an operation condition under which the safety of a plant is not secured is likely to be instructed to an operating device and the like. In order to secure the safety of the plant, the operator is notified of a recommendation, checks the details of the recommendation, and then performs an actual operation in some cases without directly inputting an operation instruction output by the system to a device in the plant.

SUMMARY OF THE INVENTION

On aspect of the present invention provides a plant control device, a plant control method, and a recording medium in which the safety is high and the costs can be reduced.

A plant control device according to one aspect of the present invention may include a register configured to register a simulated dangerous condition which is a simulated representation of an operation condition under which a plant is dangerous, a first acquirer configured to acquire an operation condition of the plant, a learner configured to learn the operation condition acquired and the simulated dangerous condition registered and produce an operation model of the plant, a determiner configured to determine an operation parameter of the plant on the basis of the operation condition acquired and the operation model produced, and an instructor configured to instruct an operation of the plant on the basis of the operation parameter determined.

In the plant control device described above, the learner may be configured to learn the operation condition acquired and the simulated dangerous condition registered as a loss function indicating nonconformity with the operation condition, associate the operation condition with the loss function, and produce the operation model. The determiner may be configured to calculate the loss function of the operation condition acquired and determine the operation parameter to reduce the loss function on the basis of the operation model produced.

In the plant control device described above, the learner may be configured to produce the operation model to increase the loss function in the simulated dangerous condition learned.

In the plant control device described above, the instructor may be configured to instruct a device used to adjust the operation condition to operate the plant.

In the plant control device described above, the instructor may be configured to instruct an operator who operates a device used to adjust the plant to operate the plant.

The plant control device described above may further include a second acquirer configured to acquire a target yield of the plant. The determiner may be configured to determine the operation parameter to prevent the simulated dangerous condition on the basis of the operation model when the target yield acquired has been changed.

In the plant control device described above, the second acquirer may be configured to further acquire a setting period of the target yield. The determiner may be configured to determine the operation parameter on the basis of the target yield in the setting period acquired.

In the plant control device described above, the simulated dangerous condition may be represented as dangerous regions using numerical value ranges of measured values of one or more devices provided in the plant.

In the plant control device described above, the instructor may be configured to instruct the device to operate the plant immediately after the determiner determines the operation parameter.

In the plant control device described above, the instructor may be configured to instruct the operator to operate the plant at the time of a predetermined timing.

A plant control method according to another aspect of the present invention may include registering a simulated dangerous condition which is a simulated representation of an operation condition under which a plant is dangerous, acquiring an operation condition of the plant, learning the operation condition acquired and the simulated dangerous condition registered and producing an operation model of the plant, determining an operation parameter of the plant on the basis of the operation condition acquired and the operation model produced, and instructing an operation of the plant on the basis of the operation parameter determined.

In the plant control method described above, the learning and the producing of the operation model may include learning the operation condition acquired and the simulated dangerous condition registered as a loss function indicating nonconformity with the operation condition, associating the operation condition with the loss function, and producing the operation model. The determining of the operation parameter may include calculating the loss function of the operation condition acquired and determining the operation parameter to reduce the loss function on the basis of the operation model produced.

In the plant control method described above, the learning and the producing of the operation model may include producing the operation model to increase the loss function in the simulated dangerous condition learned.

In the plant control method described above, the instructing of the operation of the plant may include instructing a device used to adjust the operation condition to operate the plant.

In the plant control method described above, the instructing of the operation of the plant may include instructing an operator who operates a device used to adjust the plant to operate the plant.

The plant control method described above may further include acquiring a target yield of the plant. The determining of the operation parameter may include determining the operation parameter to prevent the simulated dangerous condition on the basis of the operation model when the target yield acquired has been changed.

The plant control method described above may further include acquiring a setting period of the target yield. The determining of the operation parameter may include determining the operation parameter on the basis of the target yield in the setting period acquired.

In the plant control method described above, the simulated dangerous condition may be represented as dangerous regions using numerical value ranges of measured values of one or more devices provided in the plant.

In the plant control method described above, the instructing of the operation of the plant to the device may be performed immediately after determining the operation parameter.

A non-transitory computer-readable storage medium storing a plant control program according to still another embodiment of the present invention, which when executed by a computer, may cause the computer to register a simulated dangerous condition which is a simulated representation of an operation condition under which a plant is dangerous, acquire an operation condition of the plant, learn the operation condition acquired and the simulated dangerous condition registered and produce an operation model of the plant, determine an operation parameter of the plant on the basis of the operation condition acquired and the operation model produced, and instruct an operation of the plant on the basis of the operation parameter determined.

According to one aspect of the present invention, a plant control device, a plant control method, and a recording medium can be provided in which the safety is high and the costs can be reduced.

BRIEF DESCRIPTION OF THE DRAWINGS

FIG. 4 is a diagram showing an example of a simulated dangerous condition learned by the plant control device according to the embodiment.

FIG. 5 is a diagram showing an example of history data learned by the plant control device according to the embodiment.

DETAILED DESCRIPTION OF THE INVENTION

A plant control device, a plant control method, and a recording medium according to an embodiment of the present invention will be described in detail below with reference to the drawings.

Figure 1:
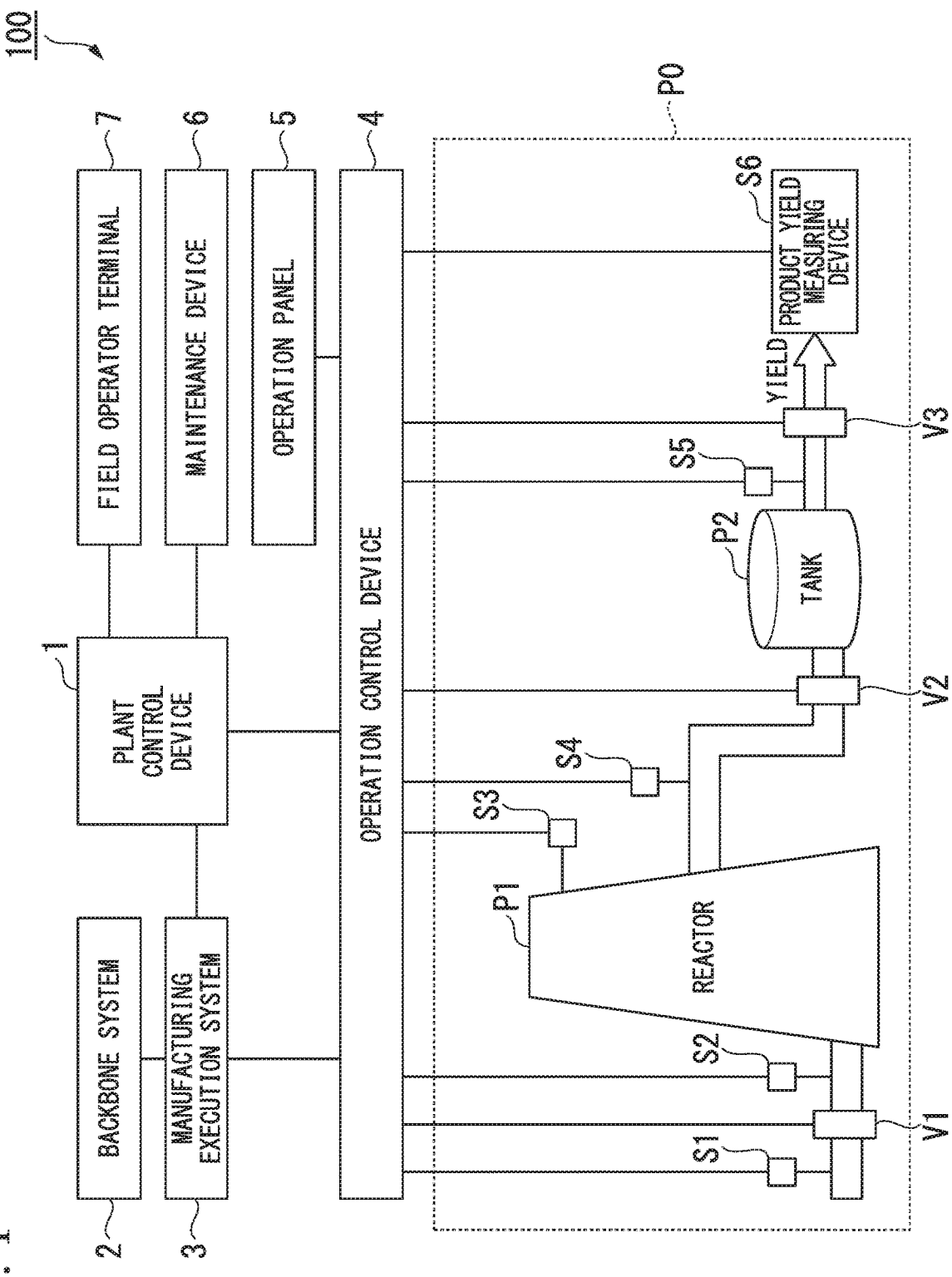
FIG. 1 is a diagram showing an example of a configuration of a plant using a plant control device according to an embodiment.

First, an overview of a plant using a plant control device will be described using FIG. 1. FIG. 1 is a diagram showing an example of a configuration of the plant using the plant control device according to an embodiment. In FIG. 1, a plant 100 includes a plant control device 1, a backbone system 2, a manufacturing execution system 3, an operation control device 4, an operation panel 5, a maintenance device 6, a field operator terminal 7, and a plant unit P0.

The plant unit P0 includes, for example, a reactor P1, a tank P2, sensors S1 to S6, and valves V1 to V3. The plant unit P0 produces a predetermined product (product). The reactor P1 is, for example, a device configured to chemically react input materials and to produce a product. The tank P2 receives the product produced by the reactor P1. The sensors S1 to S6 are devices configured to input, for example, signals of physical quantities (a pressure, a temperature, and the like) of a differential pressure gauge, a thermometer, a flow meter, and the like to the operation control device 4. The sensor S6 is a measuring unit configured to measure a yield of the product produced by the plant unit P0. In this embodiment, the plant 100 is controlled using the yield of the product measured by the sensor S6 as a target yield. The valves V1 to V3 are devices configured to receive instructions on degrees of valve opening from the operation control device 4 and vary a flow rate and the pressure of the material or the product using the degrees of valve opening. The flow rate and the pressure of the material or the product are varied in accordance with the degrees of valve opening. Hereinafter, the sensors S1 to S6 and the valves V1 to V3 in the plant unit P0 are referred to as a "field device." The field device is a control target of the plant control device 1, and the yield and the like of the product using the plant unit P0 can be controlled by controlling the field device. Note that the plant unit P0 mentioned herein may be referred to as one or more devices included in the plant unit P0 in the following description. Furthermore, the plant unit P0 shown in FIG. 1 is an example of a configuration of the plant, and the plant unit P0 is not limited to the above-described configuration.

For example, switches and the like may be included as devices which input signals into the operation control device 4. Furthermore, an actuator such as a pump and a device such as a heater may be included as devices which receive instructions from the operation control device 4. Lines used to connect the devices shown in FIG. 1 are wired or wireless communication lines. Wired communication or wireless communication may be performed over communication devices and networks (not shown).

The backbone system 2 is, for example, an enterprise resource planning (ERP: management resource integration) system for process manufacturers configured to manage management resources such as accounting processing, production management, and sales management. The backbone system 2 may use information on operation conditions for the plant as management information on management resources. Furthermore, the backbone system 2 may include a maintenance management system and the like configured to manage business information on maintenance and repair of the plant. The backbone system 2 is, for example, a general-purpose computer such as a server device, a desktop type personal computer (PC) or the like.

The manufacturing execution system 3 is, for example, a manufacturing execution system (MES) located between the backbone system 2 and the operation control device 4 and monitors or manages operating states of the plant unit P0, working situations of an operator, and the like acquired by the operation control device 4. The manufacturing execution system 3 outputs, for example, information on a target yield and the like acquired from the backbone system 2 to the plant control device 1 via communication with the plant control device 1. Furthermore, information on an operation instruction used to operate the plant unit P0 acquired from the plant control device 1 is acquired. The manufacturing execution system 3 is, for example, a general-purpose computer such as a server device, a desktop type PC or the like.

The operation control device 4 acquires measured values and the like in the sensors from the devices such as the sensors S1 to S6 and outputs instructions used to operate the devices such as the valve V1 to the valve V3 to control an operation of the field device. In this embodiment, measured values acquired from the sensors S1 to S6 and output values output to the valve V1 to the valve V3 and the like are each indexes (hereinafter referred to as "numerical value indexes") indicated as numerical values indicating the operation conditions of the plant, and the operation control device 4 outputs the numerical value indexes to the plant control device 1. The operation control device 4 is, for example, a device such as a factory automation (FA) computer, a programmable logic controller (PLC) or the like.

The operation panel 5 is a device in which a field operator in the plant monitors operating states of the field device and operates the field device. The operation panel 5 includes, for example, display units such as a lamp and a display or operating units such a push button switch and a keyboard. In this embodiment, the field operator receiving an operation instruction used to instruct the field operator to operate the plant which is output from the plant control device 1 which will be described below operates the field device in the plant unit P0 using the operating units in the operation panel 5.

The maintenance device 6 is a device by which the field operator performs maintenance on the field device. The maintenance of the field device includes, for example, a process of reading and checking device information set for the field device, a process of setting new device information (parameters) for the field device, a process of adjusting or changing the device information set for the field device, a process of setting the device information for the field device and performing a predetermined operation, and the like. The maintenance device 6 has a communication function of performing communication with the field device, for example, by using wired communication or wireless communication. The maintenance device 6 performs maintenance on the field device using the communication function. Information transmitted and received between the maintenance device 6 and the field device in the above-described maintenance performed by the maintenance device 6 using the communication function is referred to as "maintenance information." Such maintenance information may include text information, image information, sound information, and the like recorded in the maintenance device 6 by the field operator in addition to information read from the field device as described above. The maintenance device 6 transmits the maintenance information to the plant control device 1. The maintenance device 6 is a notebook type or tablet type computer, a personal digital assistant (PDA), a smartphone, or the like.

The field operator terminal 7 is a terminal device carried by the field operator. The field operator terminal 7 acquires an operation instruction used to instruct the field operator terminal 7 to operate the plant which is output from the plant control device 1. The field operator terminal 7 acquires an operation instruction using, for example, communication means such as an e-mail, a chat, a voice call, and the like from the plant control device 1 and notifies the field operator of the operation instruction. The field operator terminal 7 includes, for example, a notebook type or tablet type computer, a PDA, a smartphone, or the like.

The plant control device 1 communicates with the manufacturing execution system 3, the operation control device 4, the maintenance device 6, and the field operator terminal 7. The plant control device 1 acquires states of the field device from the operation control device 4 and the maintenance device 6. Furthermore, the plant control device 1 acquires simulated dangerous conditions which are a simulated representation of the operation conditions under which the plant is dangerous from the manufacturing execution system 3. The plant control device 1 learns each of the operation conditions of the plant on the basis of the acquired information and produces an operation model of the plant. The plant control device 1 determines nonconformity with current operation conditions of the plant on the basis of the produced operation model and determines operation parameters set for the field device used to optimize the operation conditions. The plant control device 1 outputs an operation instruction to the operation control device 4 or the field operator terminal 7 on the basis of the determined operation parameters. Since the plant control device 1 can replace or assist a board operator to output an operation instruction, the number of man-made mistakes of the board operator can reduced and thus safety of the plant is improved. Furthermore, since a load with respect to the board operator can be removed or lightened by replacing or assisting the board operator, personnel expenses of the board operator is reduced so that running costs of a plant operation are reduced.

Figure 2:
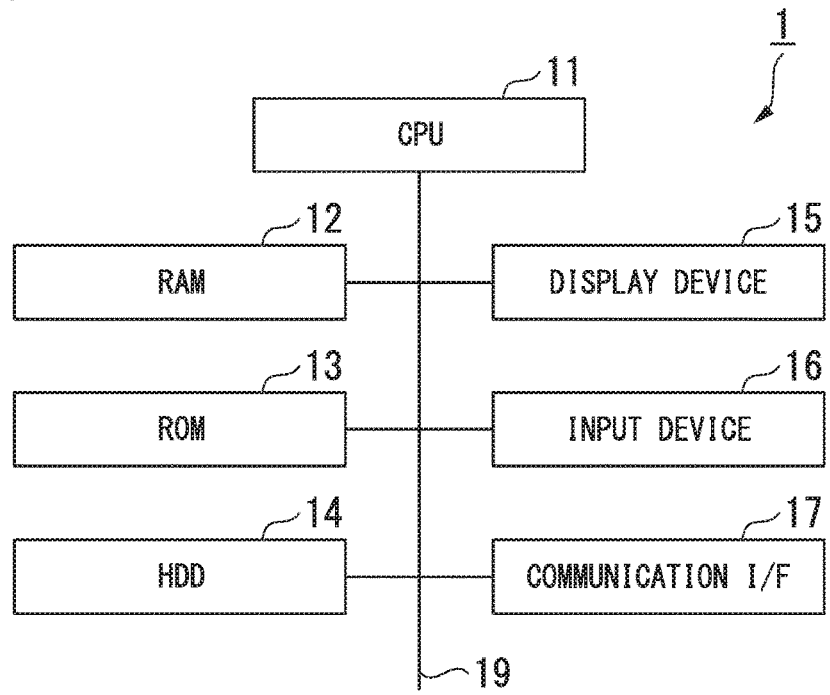
FIG. 2 is a block diagram showing an example of a hardware configuration of the plant control device according to the embodiment.

Next, a hardware configuration of the plant control device 1 will be described using FIG. 2. FIG. 2 is a block diagram showing an example of the hardware configuration of the plant control device 1 according to the embodiment.

In FIG. 2, the plant control device 1 includes a central processing unit (CPU) 11, a random access memory (RAM) 12, a read only memory (ROM) 13, a hard disk drive (HDD)

14, a display device 15, an input device 16, a communication interface (I/F) 17, and a bus 19 configured to connect these.

The plant control device 1 includes, for example, a server device, a general-purpose computer such as a desktop type PC, a device such as an FA computer and a PLC, a notebook type or tablet type computer, a PDA, a smartphone, or the like. The plant control device 1 replaces or assists the board operator and may be provided, for example, near a monitoring terminal (not shown) monitored by the board operator.

The CPU 11 executes programs stored in the RAM 12, the ROM 13, or the HDD 14 to perform control of the plant control device 1. The CPU 11 executes a plant control program used to realize an operation of the plant control device 1 which will be described below. The plant control program is acquired from, for example, a recording medium on which the plant control program is recorded, a server from which the plant control program is provided over networks, and the like, is installed in the HDD 14, and is stored in the RAM 12 so as to be readable by the CPU 11.

The display device 15 includes, for example, a liquid crystal display with a display function. The display device 15 may be realized in various forms such as a head mount type display, a glass type display, and a watch type display. The input device 16 is, for example, a keyboard or a mouse with an input function. The input device 16 may be a microphone configured to receive an input of sound information, a camera configured to receive an input of image information, or the like. Note that the display device 15 and the input device 16 may be realized using a device with a display function and an input function such as a touch panel.

The communication I/F 17 controls communication with other devices such as the manufacturing execution system 3, the operation control device 4, the maintenance device 6, and the field operator terminal 7 over wired communication or wireless communication. The communication I/F 17 performs communication control for data transmission and reception, a voice call, e-mail transmission and reception, and the like with the connected other devices. The communication I/F 17 may be, for example, an I/F configured to perform communication control corresponding to a communication standard dedicated to an industrial instrument such as ISA100 serving as a wireless communication standard of the International Society of Automation (ISA: International Society for Measurement and Control), a highway addressable remote transducer (HART) (registered trademark), BRAIN (registered trademark), FOUNDATION Fieldbus, PROFIBUS. Furthermore, the communication I/F 17 may be an I/F configured to perform communication control corresponding to a general purpose communication standard such as wireless local area network (LAN) communication, wired LAN communication, infrared communication, and short-range wireless communication.

Figure 3:
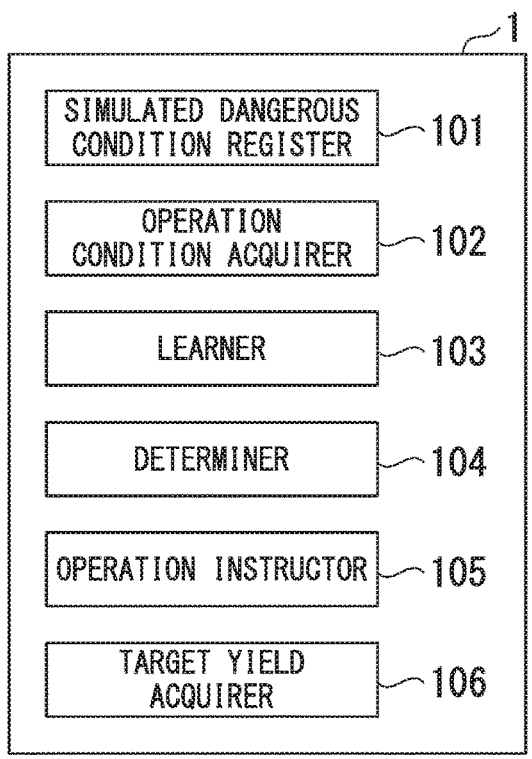
FIG. 3 is a block diagram showing an example of a functional configuration of the plant control device according to the embodiment.

Next, a functional configuration of the plant control device 1 will be described using FIG. 3. FIG. 3 is a block diagram showing an example of the functional configuration of the plant control device 1 according to the embodiment.

In FIG. 3, the plant control device 1 has functions of a simulated dangerous condition register 101 (register), an operation condition acquirer 102 (first acquirer), a learner 103, a determiner 104, an operation instructor 105 (instructor), and a target yield acquirer (second acquirer) 106. The above-described functions of the plant control device 1 are function modules realized using the plant control program used to control the plant control device 1. The plant control program may be supplied from a server configured to supply programs or may be supplied from a recording medium.

The simulated dangerous condition register 101 acquires each of the simulated dangerous conditions which are a simulated representation of the operation conditions under which the plant is dangerous and registers the simulated dangerous condition in a storage device such as the HDD 14 in FIG. 2. The operation conditions under which the plant is dangerous refer to operation conditions under which the plant unit P0 in FIG. 1 is highly likely to fail or an accident is highly likely to occur in the plant unit P0 and a state represented using measured values acquired from one or more field devices such as the sensors S1 to S6. Since the control is performed so that the plant is not put into the operation conditions under which the plant is dangerous in a normal operation of the plant, it is difficult to learn the operation conditions under which the plant is dangerous even when the operation conditions of the plant are learned on the basis of the information acquired from the field device and the like, and operation conditions in an actual plant cannot be put into such operation conditions. In this embodiment, simulated dangerous conditions which are a simulated representation of represented using the operation conditions under which the plant is dangerous as indexes of measured values and the like of the field device are prepared in advance and are used for generating an operation model which will be described below.

The simulated dangerous conditions can each be represented as dangerous regions using numerical value ranges of measured values of one or more field devices. For example, when it can be determined whether the plant is dangerous with measured values of one sensor, the simulated dangerous conditions can be represented as dangerous regions of numerical value ranges of the measured values of the one sensor. Furthermore, when it can be determined whether the plant is dangerous in measured values of a plurality of sensors, the simulated dangerous conditions can be represented as dangerous regions of combinations of numerical value ranges of measured values of the plurality of sensors. For example, when ranges of measured values of n sensors are combined, a dangerous region can be represented as an n-dimensional space. Note that such a dangerous region will be described with reference to FIG. 6.

Also, the simulated dangerous conditions can also be registered as a qualitative state which cannot be represented using measured values of the field device. Maintenance records such as image information obtained by photographing a device, sound information obtained by recording abnormal sound, and text information input by the field operator are recorded in the maintenance device 6 and the maintenance records can be used as simulated dangerous conditions when any abnormality has been found using hearing, olfaction, touch, and the like in a maintenance task performed on the field device by the field operator. The simulated dangerous condition register 101 may acquire and register simulated dangerous conditions from the recorded maintenance information.

The simulated dangerous conditions registered by the simulated dangerous condition register 101 are recorded on the HDD 14 or the like in FIG. 2 so as to be readable by the learner 103. The simulated dangerous condition register 101 may change or delete each of the registered simulated dangerous conditions.

The operation condition acquirer 102 acquires operation conditions of the plant unit P0. In this embodiment, the operation conditions of the plant unit P0 are represented using measured values and the like of the sensors S1 to S6. The operation condition acquirer 102 requests, for example, acquisition of measured values from the sensors S1 to S6 and acquires the measured values. The operation condition acquirer 102 sequentially records the acquired operation conditions.

The learner 103 learns the operation conditions of the plant unit P0 acquired in the operation condition acquirer 102 and the simulated dangerous conditions registered in the simulated dangerous condition register 101 and produces an operation model of the plant unit P0. The learner 103 performs machine learning using the acquired operation conditions as input information. In this embodiment, a support vector machine (SVM) method is used as a machine learning method. The learner 103 selects measured values to be classified as classes from the measured values of the sensors S1 to S6. The selection of the measured values is set in advance. The learner 103 uses a multi-class SVM (MMSVM) method configured to prepare "nC2" SVMs with respect to n classes when classes to be classified are n classes (multi-classes). The MMSVM method is used so that it is easy to produce a model associated with the operation conditions with respect to the measured values acquired from the plurality of sensors in the plant.

The learner 103 learns the operation conditions of the plant unit P0 acquired in the operation condition acquirer 102 and the simulated dangerous conditions registered in the simulated dangerous condition register 101 as loss functions representing nonconformity with the operation conditions of the plant unit P0 and associates the operation conditions of the plant unit P0 with the loss functions and produces an operation model. The loss functions can be calculated on the basis of for example, a yield of a product of the plant unit P0. An instantaneous yield of the product can be increased when a load of an input quantity or the like of a raw material to the plant unit P0 is increased. However, as the load to the plant unit P0 is increased, an operating rate is lowered due to failure or the like of the plant unit P0 in some cases, and a yield thereof is lowered for a long time is some cases. The learner 103 can calculate loss functions using a decrease in the yield in a predetermined period as a negative bias to produce an operation model.

The learner 103 produces the operation model such that the loss functions increase in the simulated dangerous conditions registered in the simulated dangerous condition register 101. For example, the learner 103 produces the operation model such that the negative bias of the loss functions in the simulated dangerous conditions is maximized so that a learned operation pattern can be produced so that the operation conditions of the plant unit P0 are not put into the simulated dangerous conditions.

Note that the machine learning method used for the learner 103 is not limited to the SVM and may use, for example, a neural network method such as deep learning. The learner 103 produces an operation model on the basis of the operation conditions which are previously acquired by the operation condition acquirer 102 and recorded. The learner 103 may update the produced operation model when the operation conditions are newly acquired.

The determiner 104 determines operation parameters in the plant on the basis of the operation conditions of the plant unit P0 acquired in the operation condition acquirer 102 and the operation model produced in the learner 103. The determiner 104 calculates the loss functions with respect to the operation conditions of the plant unit P0 acquired in the operation condition acquirer 102 on the basis of a target yield of the plant unit P0 acquired by the target yield acquirer 106 and a setting period of the target yield. The determiner 104 determines the operation parameters of the plant unit P0 to reduce the calculated loss functions (to increase the yield of the product in the setting period) on the basis of the operation model produced by the learner 103. The operation parameters of the plant unit P0 are, for example, parameters indicating the degrees of opening of the valves V1 to V3.

The determiner 104 calculates the loss functions again on the basis of the changed target yield when the target yield has been changed and changes the operation parameters set for the field device. Here, the determiner 104 changes the operation parameters so that the simulated dangerous conditions registered in the simulated dangerous condition register 101 are prevented when the current set operation parameters are changed to new operation parameters corresponding to the changed target yield. A change of the operation parameters used to prevent dangerous conditions will be described below using FIG. 6.

The operation instructor 105 outputs the operation instruction used to instruct the field device or the field operator to operate the plant unit P0 on the basis of the operation parameters determined in the determiner 104. The operation instructor 105 outputs the operation instruction to the field device or the field operator. For example, the operation instructor 105 outputs current values of 4 to 20 mA to the operation control device 4 in accordance with the degrees of valve opening of the valves V1 to V3 determined in the determiner 104. Furthermore, the operation instructor 105 converts the degrees of valve opening of the valves V1 to V3 determined in the determiner 104 into text of an e-mail and sends the e-mail on the operation instruction to the field operator. An output of the operation instruction is performed at a predetermined timing. For example, an output of the operation instruction to the operation control device 4 is performed immediately when the operation parameters are determined. On the other hand, the operation instruction to the field operator is performed at a predetermined transmission timing such that a large amount of e-mails are not sent.

The operation instructor 105 can output the operation instruction to the field device or the field operator to reduce or eliminate a load on the board operator. Note that the operation instructor 105 may display the details of the operation instruction output to the field device or the field operator on the display device 15 in FIG. 2 and notify the board operator of the details. The board operator may provide an instruction used to change or stop an operation instruction from the input device 16 to the operation instructor 105 when there is a problem in the notified operation instruction.

The target yield acquirer 106 acquires the target yield of the product of the plant unit P0 and inputs the target yield to the determiner 104. The target yield acquirer 106 acquires the acquired target yield as well as a setting period of the target yield. The target yield acquirer 106 acquires a ratio (%) at which, for example, a maximum yield in the plant unit P0 which is input from the input device 16 in FIG. 2 is set as 100% as a target yield. Note that the target yield acquired by the target yield acquirer 106 may be set using a quantity, a volume, a weight, and the like. Furthermore, the target yield acquirer 106 acquires, for example, a period of one hour unit which is input from the input device 16 in FIG. 2 as a setting period of the target yield.

Note that a case in which the functions of the simulated dangerous condition register 101, the operation condition acquirer 102, the learner 103, the determiner 104, the operation instructor 105, and the target yield acquirer 106 are realized using software has been described in FIG. 3. However, one or more functions in the above-described functions may be realized using hardware. Furthermore, each of the above-described functions may be realized by dividing one function into a plurality of functions. Moreover, each of the above-described functions may be realized by integrating two or more functions into one function.

Next, the simulated dangerous conditions learned by the plant control device 1 will be described using FIG. 4. FIG. 4 is a diagram showing an example of the simulated dangerous conditions learned by the plant control device 1 according to the embodiment. The simulated dangerous conditions shown in FIG. 4 are registered in the simulated dangerous condition register 101 in FIG. 3.

In FIG. 4, KJ1 to KJ3 are each simulated dangerous conditions. The simulated dangerous conditions are set as numerical value indexes in which numerical value ranges of the sensors S1 to S6 and the valves V1 to V3 in the field device are represented using loss functions. For example, the simulated dangerous condition KJ1 is represented using numerical value indexes of a11 to a19. Loss functions of the numerical value indexes of a11 to a19 may be set using, for example, an expression based on a threshold value of measured values or the measured values.

For example, when a loss function is set using numerical value ranges of one temperature sensor, numerical value indexes may be set as follows:

In the case of less than 50° C., a loss function=0.
In the case of 50° C. or more and less than 100° C., a loss function=−50.
In the case of 100° C. or more, a loss function=0.

Also, in the case of temperature of t° C., numerical value indexes may be set as follows:

a loss function=$-A1 \cdot t + A2$ ($A1$ and $A2$ are integers).

When a loss function is set using numerical value ranges of three temperature sensors (ta° C., tb° C., and tc° C.), numerical value indexes may be set as follows:

a loss function=$-B1 \cdot ta - B2 \cdot tb^2 - B3 \cdot tc^2$ ($B1$, $B2$, and $B3$ are integers).

A numerical value index of the sensor S6 is a measured value obtained by measuring the yield of the product of the plant unit P0. In this embodiment, the yield of the product is used as one index indicating one of the operation conditions of the plant. The numerical value index of the sensor S6 has a larger loss function when a difference between the numerical value index thereof and the target yield acquired by the target yield acquirer 106 is larger. A loss function is calculated for each target yield so that each of the loss functions can be calculated when the target yields differ. Note that the learner 103 produces an operation model such that the yield approaches the target yield, but the learner 103 may produce an operation model such that a loss function is smaller when the yield is higher, for example, when the target yield is not set.

Note that the numerical value indexes may be set using a combination of the measured values of the sensors (S1 to S6) and the degrees of opening of the valves (V1 to V3). In this embodiment, the operation conditions of the plant at this time are calculated as loss functions on the basis of the measured values of the sensors S1 to S6 and the degrees of opening of the valves V1 to V3 in the field device. In the simulated dangerous conditions shown in FIG. 4, a state which is less likely to occur under the normal operation conditions of the plant unit P0 is set as a simulated dangerous condition in advance, and negative biases in the loss functions in the simulated dangerous conditions are set to be high so that operation parameters can be determined to prevent this state.

Note that, since the simulated dangerous conditions can be set as independent conditions as shown as KJ1 to KJ3, it is easy to add or delete the simulated dangerous conditions. Furthermore, a plurality of simulated dangerous conditions may overlap. When the simulated dangerous conditions have overlapped, a priority used to calculate a loss function using any of the simulated dangerous conditions may be set.

Next, history data learned by the plant control device 1 will be described using FIG. 5. FIG. 5 is a diagram showing an example of the history data learned by the plant control device 1 according to the embodiment. The history data shown in FIG. 5 is acquired from the field device by the operation condition acquirer 102 in FIG. 3 and recorded.

In FIG. 5, the history data is obtained by associating an acquisition time at which the operation condition acquirer 102 has acquired measured values with the acquired measured values and recording the association. The history data is recorded, for example, at regular intervals. FIG. 5 shows history data recorded at 1 minute intervals. The records of the history data may be acquired in accordance with a change in measured value. The records of the history data may be acquired, for example, when predetermined measured values are within a predetermined range, when an amount of change in the predetermined measured values is a predetermined value or more, or the like.

When it is determined that the acquired history data is dangerous in the operation conditions of the plant unit P0, the history data may be designated to be added as simulated dangerous conditions. In the simulated dangerous conditions described with reference to FIG. 4, a predetermined loss function with respect to the measured values can be set in advance, a predetermined region of the measured values can be set as simulated dangerous conditions, and a loss function can be changed in accordance with a difference of the measured values even in the same simulated dangerous conditions. On the other hand, since the measured values at this time are acquired from one point in the history data, it is desirable that loss functions when the measured values are registered as the simulated dangerous conditions can be set individually. In this embodiment, a case in which A to C levels can be set in accordance with each magnitude of the loss functions is shown. For example, simulated dangerous conditions obtained by setting an A level with a high loss function (with high dangerousness) to history data acquired at 10:22 on Oct. 10, 2016 are added. Furthermore, simulated dangerous conditions obtained by setting a C level with a low loss function (with low dangerousness) to history data acquired at 10:23 on Oct. 10, 2016 are added. Operation parameters with high safety can be generated by learning, as simulated dangerous conditions, simulated dangerous conditions obtained by setting a level of a loss function to history data acquired under actual operation conditions of the plant unit P0.

Figure 6:
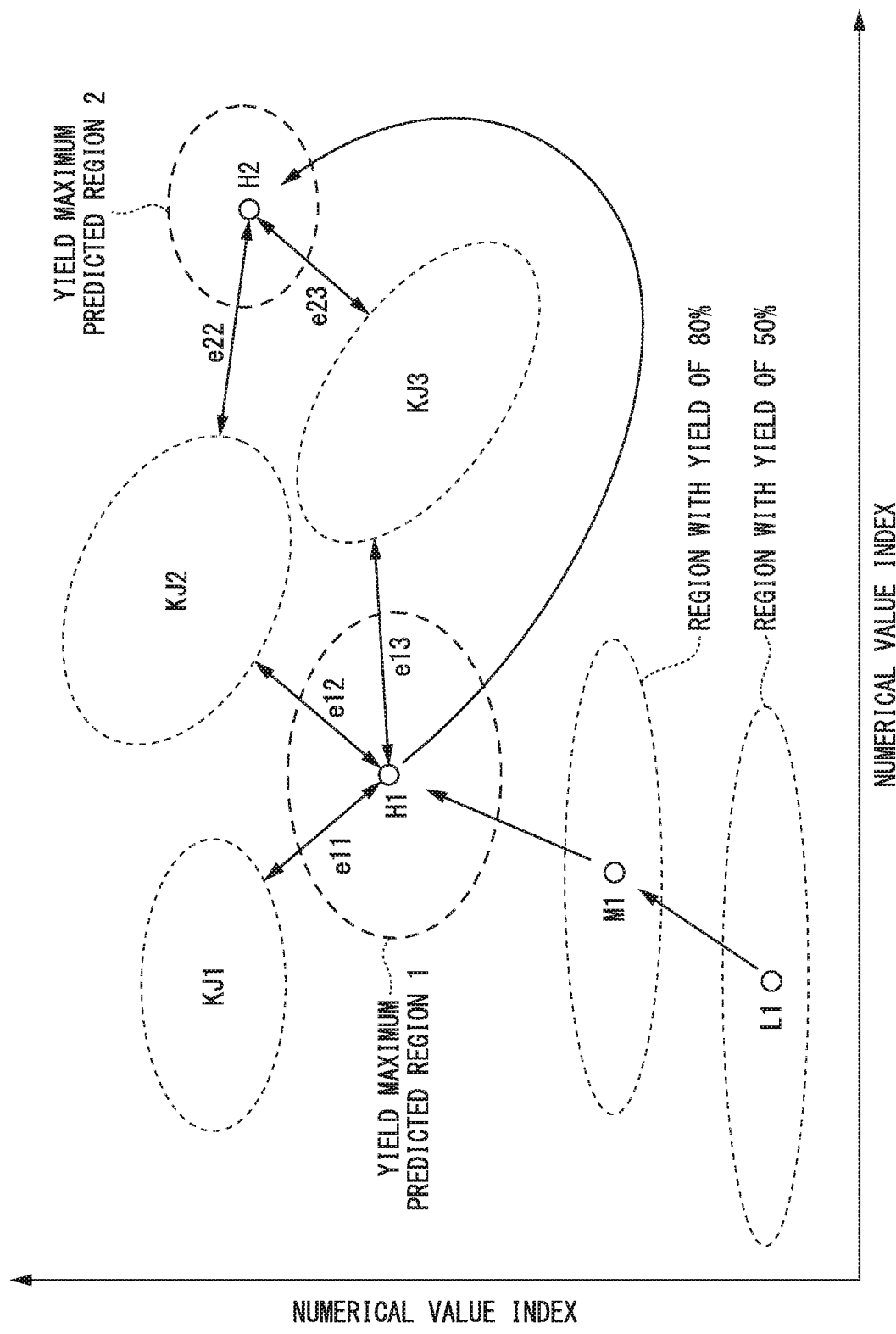
FIG. 6 is a diagram showing an example of a space including a simulated dangerous condition learned by the plant control device according to the embodiment.

Next, a space including simulated dangerous conditions learned by the plant control device 1 will be described using FIG. 6. FIG. 6 is a diagram showing the space including the simulated dangerous conditions learned by the plant control device 1 according to the embodiment.

A vertical axis and a horizontal axis in FIG. 6 indicate two dimensional regions formed by any two numerical value indexes described in FIG. 4. Although a total of nine numerical value indexes of S1 to S6 and V1 to V3 are shown in FIG. 4, a space in which all of the nine numerical value indexes are combined forms a nine dimensional space. FIG. 6 shows a two dimensional region formed by two numerical value indexes for simplicity of explanation.

KJ1, KJ2, and KJ3 indicate regions of the simulated dangerous conditions set in the numerical value indexes. In other words, operation parameters used to control the operation conditions of the plant are determined such that the operation conditions thereof are not within the regions of KJ1 to KJ3.

L1, M1, and H1 indicate operation conditions used for operation parameters determined for target yields. For example, when the target yield is 50%, operation parameters are determined so that the yield is the operation condition of L1 which is stabilized as 50% on the basis of the operation model produced by machine learning. A region shown and indicated by a broken line is a region in which the yield is predicted to be approximately 50% in the operation model produced from the history data.

Also, when the target yield is 80%, the operation parameters are determined so that the yield is the operation condition of M1 which is stabilized as 80% on the basis of the operation model produced by the machine learning. A region shown and indicated by a broken line is a region in which the yield is predicted to be approximately 80% in the operation model produced from the history data. The operation condition is linearly changed from L1 to M1 when the target yield has been changed from 50% to 80%.

In FIG. 6, a region shown and indicated by a broken line as a yield maximum predicted region 1 is a region in which the yield obtained using the machine learning is predicted to be maximized. The operation condition at this time is set as H1. The operation condition H1 is determined such that the operation conditions are not the simulated dangerous conditions KJ1 to KJ3. e11 to e13 which are shown indicate sizes of a safety margin from the operation conditions H1 to the simulated dangerous conditions. The simulated dangerous conditions are set in advance in the machine learning so that a region in which the yield is safely maximized can be predicted. When the target yield has been changed from 80% to 100%, the operation conditions are linearly changed from M1 to H1.

Also, in FIG. 6, a region indicated by a broken line shown as a yield maximum predicted region 2 is a region which is different from the yield maximum predicted region 1 in which the yield obtained by the machine learning is predicted to be maximized. The operation condition at this time is set as H2. e22 to e23 which are shown indicate sizes of a safety margin from the operation conditions H2 to the simulated dangerous conditions.

When the board operator provides an operation instruction to the field operator, the board operator instructs the field operator of operation parameters in which the operation conditions having a safety margin are provided to such an extent that the plant is not dangerous even when the yield is maximized. On the other hand, in the machine learning according to this embodiment, the history data as well as simulated dangerous regions are set so that the operation conditions can be changed while a dangerous condition is prevented. Therefore, for example, the operation condition of H2 in which the operation conditions cannot be linearly changed are likely to be found using the machine learning on the basis of the operation conditions of H1.

Since the plant has states of the simulated dangerous conditions KJ2 or KJ3 when the operation conditions are linearly changed from H1 to H2, it is difficult to change the states when the board operator provides the operation instruction to the field operator. On the other hand, in this embodiment, the simulated dangerous conditions are set in advance so that operation parameters which change the operation conditions under which a safety margin calculated using the loss function from the simulated dangerous condition KJ3 has been secured are appropriately determined, and thus the operation conditions can be changed to H2 while the simulated dangerous condition KJ3 is prevented as shown by an arrow transitioning from H1 to H2 in FIG. 6.

In other words, in this embodiment, an operation model obtained by learning the simulated dangerous conditions in advance is created so that operation parameters by which static operation conditions indicated by H1 and H2 are obtained can be determined, and operation parameters by which dynamic operation conditions such as a transition method of an operation condition is obtained can be determined.

Figure 7:
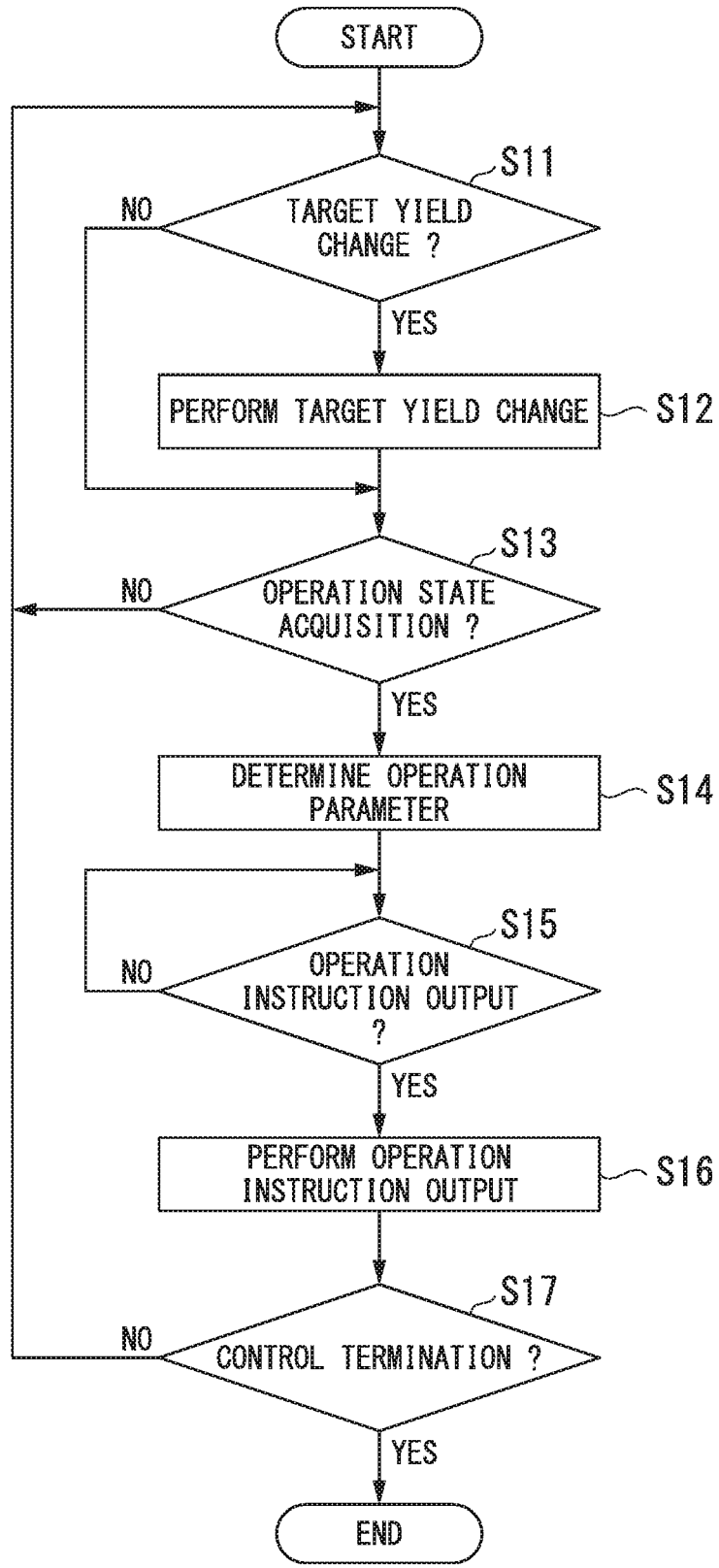
FIG. 7 is a flowchart for describing an example of an operation of the plant control device according to the embodiment.

Next, an operation of the plant control device 1 will be described using FIG. 7. FIG. 7 is a flowchart for describing an example of an operation of the plant control device 1 according to the embodiment. In the flowchart in FIG. 7, an operation of the plant control device 1 when the plant unit P0 is controlled using the operation model produced in advance using the machine learning will be described.

Note that the operation in the flowchart in FIG. 7 is realized when the CPU 11 executes a plant control device program stored in the RAM 12 in FIG. 2. Furthermore, the operation in the flowchart in FIG. 7 is realized using functions of software of the plant control device 1 described with reference to FIG. 3. In the following description, it is assumed that the operation in the flowchart will be executed by the plant control device 1.

In FIG. 7, the plant control device 1 determines whether a target yield has been changed (Step S11). The determination concerning whether the target yield has been changed can be performed depending on whether a target yield acquired in the target yield acquirer 106 has been changed. When it is determined that the target yield has been changed (Step S11: YES), the plant control device 1 changes the set target yield (Step S12). On the other hand, when it is determined that the target yield has not been changed (Step S11: NO), the plant control device 1 skips the process of Step S12. The process of Step S12 is skipped so that the set target yield is maintained.

After the process of Step S12 has been performed or when it is determined that the target yield is not changed in the process of Step S11, the plant control device 1 determines whether the operation conditions have been acquired (Step S13). The determination concerning whether the operation conditions have been acquired can be performed depending on whether the operation condition acquirer 102 has acquired measured values from the field device in the plant unit P0. When it is determined that the operation conditions are not acquired (Step S13: NO), the plant control device 1 returns to the process of Step S11, and waits for the acquisition of the operation conditions.

On the other hand, when it is determined that the operation conditions have been acquired (Step S13: YES), the plant control device 1 determines the operation conditions (Step S14). In the decision of the operation conditions, the determiner 104 determines the acquired operation conditions on the basis of the operation model produced by the learner 103 and determines operation parameters of the plant unit P0.

The plant control device 1 determines whether the operation instruction is to be output, after the process of Step S14 has been performed (Step S15). In the determination concerning whether the operation instruction is to be output, the operation instructor 105 determines that the operation instruction is to be output immediately when the operation instruction is provided to the operation control device 4. On the other hand, when the operation instruction is provided to the field operator, the operation instructor 105 determines that the operation instruction is to be output at the time of a predetermined output timing. An output timing of the operation instruction is changed according to a transmission destination so that an appropriate operation instruction can be output. When it is determined that the operation instruction is not to be output (Step S15: NO), the plant control device 1 repeatedly performs the process of Step S15, and the operation instructor 105 waits for the output timing.

On the other hand, when it is determined that the operation instruction is to be output (Step S15: YES), the plant control device 1 outputs the operation instruction (Step S16). The operation instruction is set and output as an output form according to an output destination by the operation instructor 105.

The plant control device 1 determines whether plant control is to be terminated, after the process of Step S16 has been performed (Step S17). In the determination concerning whether the plant control is to be terminated, determination can be performed, for example, depending on whether a stop operation of the plant control has been performed from the input device 16 or the like. When it is determined that the plant control is not to be terminated (Step S17: NO), the plant control device 1 returns to the process of Step S11, and the plant control device 1 repeatedly performs the processes of Steps S11 to S17. On the other hand, when it is determined that the plant control is to be terminated (Step S17: YES), the plant control device 1 terminates the operation of the flowchart shown in FIG. 7.

Figure 8:
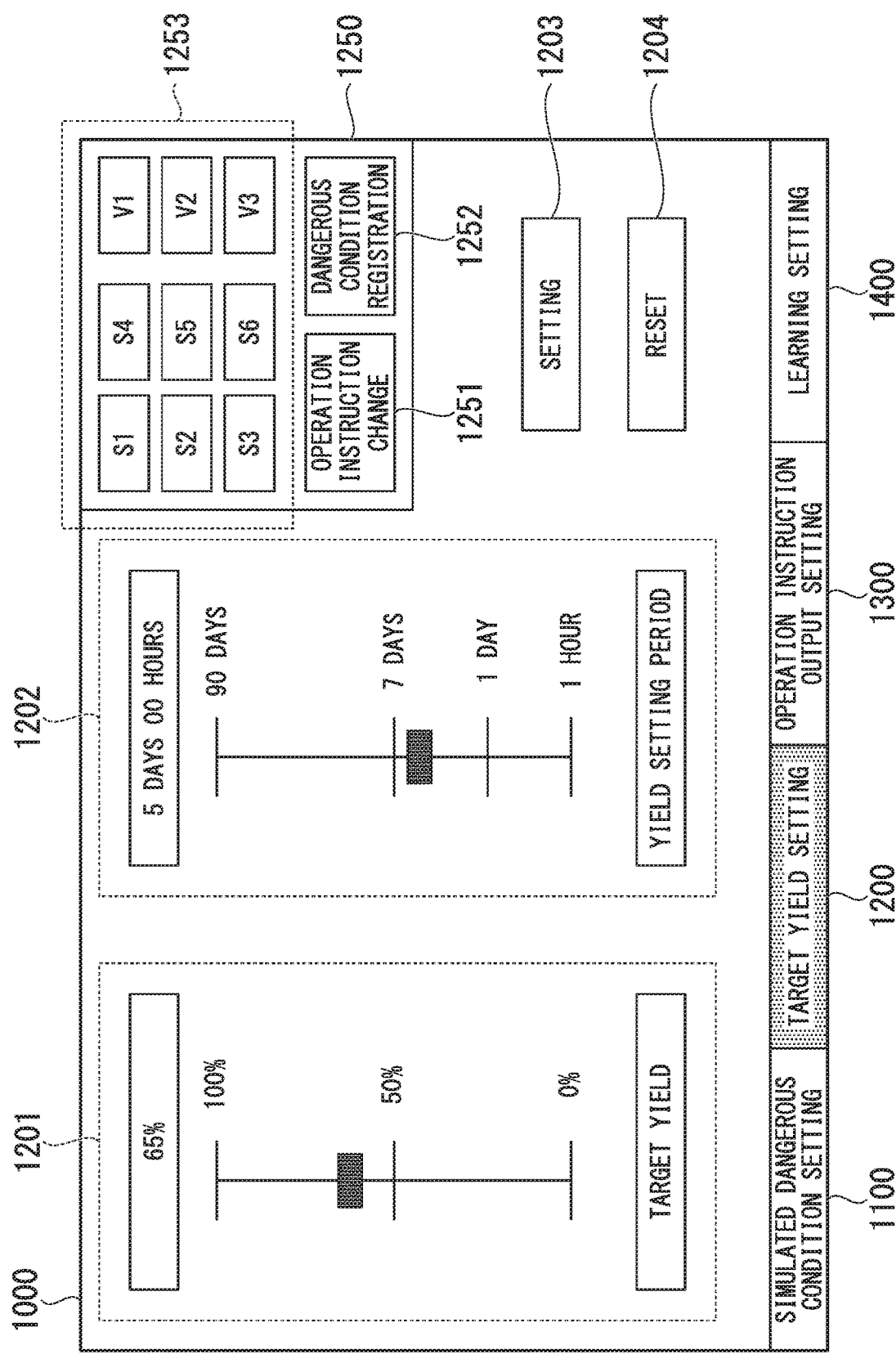
FIG. 8 is a diagram showing an example of a target yield setting screen in the plant control device according to the embodiment.

Next, a target yield setting screen in the plant control device 1 will be described using FIG. 8. FIG. 8 is a diagram showing an example of the target yield setting screen in the plant control device according to the embodiment. The target yield setting screen shown in FIG. 8 is a setting screen, for example, displayed on the display device 15 in FIG. 2 and set using the input device 16.

In FIG. 8, a target yield setting screen 1000 includes a simulated dangerous condition setting tab 1100, a target yield setting tab 1200, an operation instruction output setting tab 1300, and a learning setting tab 1400 at the bottom of the screen. Any of the tabs is selected so that a display screen can be switched between setting screens. The target yield setting screen 1000 shown in FIG. 8 indicates a state in which the target yield setting tab 1200 has been selected. Note that the simulated dangerous condition setting tab 1100 is a tab configured to select a setting screen for setting the simulated dangerous conditions described with reference to FIG. 4. The operation instruction output setting tab 1300 is a tab configured to select a setting screen for setting an output destination and an output form of the operation instruction. Furthermore, the learning setting tab 1400 is a tab configured to select a setting screen for setting measurement values acquired by the operation condition acquirer 102 and an acquisition timing.

The target yield setting screen 1000 has a target yield setting unit 1201, a yield setting period setting unit 1202, a setting button 1203, and a reset button 1204.

The target yield setting unit 1201 has a slide bar configured to slide between 0% and 100% and sets a target yield to a desired numerical value through an operation of the slide bar, for example, using a mouse. The set target yield is displayed as the numerical value above the slide bar. FIG. 8 shows a target yield which is set to 65%.

The yield setting period setting unit 1202 sets a yield setting period of the target yield set in the target yield setting unit 1201. The yield setting period setting unit 1202 sets the yield setting period to a desired numerical value through an operation of a slide bar configured to slide between one hour and 90 days, like in the target yield setting unit 1201. For example, the yield setting period is set to be short when the yield is increased for a short time. If the yield setting period is set to be short, operation parameters by which the plant unit P0 is operated are determined so that a target yield set by the target yield setting unit 1201 is obtained with a load by which the plant unit P0 is less likely to fail because the yield setting period is a short time. On the other hand, when the yield setting period is lengthened, the operation parameters used to operate the plant unit P0 are determined so that the target yield set by the target yield setting unit 1201 is obtained in the operation conditions stabilized for a long time. FIG. 8 shows a yield setting period set to 5 days 00 hours.

The setting button 1203 is a button used to confirm and register a target yield and a yield setting period set by the target yield setting unit 1201 and the yield setting period setting unit 1202. The reset button 1204 is a button used to reset a target yield and a yield setting period set by the target yield setting unit 1201 and the yield setting period setting unit 1202 to initial values.

Also, the target yield setting screen 1000 includes an operation condition setting unit 1250. The operation condition setting unit 1250 includes an operation instruction change button 1251, a dangerous condition registration button 1252, and an operation parameter display unit 1253.

The operation instruction change button 1251 as an auxiliary function is a button used to change the operation parameters determined by the determiner 104 or the operation instruction output by the operation instructor 105 in FIG. 3. For example, when the board operator recognizes the operation parameters displayed on the operation parameter display unit 1253 and determines that there is a problem in the operation parameters determined in the determiner 104, the board operator can change the determined operation parameters by operating the operation instruction change button 1251. Operation parameters by which unknown operation conditions which are not set as the simulated dangerous conditions are obtained are determined in the machine learning in some cases, and the board operator finds a problem due to the determined operation parameters in some cases. The operation instruction change button 1251 is provided such that the board operator can compensate for deficiencies in the machine learning.

The dangerous condition registration button 1252 is a button used to add the simulated dangerous conditions described with reference to FIG. 4. The board operator operates the dangerous condition registration button 1252 to add and learn the operation conditions using the operation parameters as simulated dangerous conditions when it is determined that the operation parameters displayed on the operation parameter display unit 1253 causes the plant unit P0 to be in a dangerous condition. For the simulated dangerous conditions to be added, it is assumed that the A to C levels described with reference to FIG. 5 can be set.

As described above, the plant control device in this embodiment includes a simulated dangerous condition register configured to register a simulated dangerous condition which is a simulated representation of an operation condition under which a plant is dangerous, an operation condition acquirer configured to acquire the operation condition of the plant, a learner configured to learn the registered simulated dangerous condition and the acquired operation conditions and produce an operation model of the plant, a determiner configured to determine an operation parameter of the plant on the basis of the acquired operation condition and the produced operation model, and an operation instructor configured to instruct an operation of the plant on the basis of the determined operation parameter, and thus the plant control device in which safety is high and the costs can be reduced can be provided.

Note that the above-described plant control device 1 may be adopted as long as the plant control device 1 is a device has the above-described functions and may be realized using, for example, a system constituted by combining a plurality of devices and configured to communicably connect the devices. Furthermore, the plant control device 1 may be realized as a part of the function of the operation control device 4, the maintenance device 6, or the field operator terminal 7 described with reference to FIG. 1. Note that the manufacturing execution system 3 and the operation control device 4 may also be realized using a system constituted by combining a plurality of devices and configured to communicably connect the devices like the plant control device 1.

Also, the plant control method in this embodiment includes an operation condition acquisition step of acquiring an operation condition of a plant, a simulated dangerous condition registration step of registering a simulated dangerous condition which is a simulated representation of the operation condition under which the plant is dangerous, a learning step of learning the acquired operation condition and the registered simulated dangerous condition and producing an operation model of the plant, a decision step of determining an operation parameter of the plant on the basis of the acquired operation condition and the produced operation model, and an operation instruction step of instructing an operation of the plant on the basis of the determined operation parameter, and thus the plant control method in which safety is high and the costs can be reduced can be provided.

Note that the execution order of the steps in the plant control method in this embodiment is not limited to the order in which the above steps are described and may be executed in an arbitrary order.

The above-described various processes of the present embodiment may be implemented by recording a program for implementing functions in the devices described in the present embodiment into a computer readable storage medium, making a computer system read the program stored in the storage medium, and executing the program. The "computer system" may include an operating system and a hardware such as a peripheral device. If the World Wide Web is used, the "computer system" may include an environment for providing homepage (or display environment). The "computer readable storage medium" indicates a portable medium such as a flexible disk, a magnetic optical disk, a ROM, a writable non-volatile memory such as a flash memory, a CD-ROM and a storage device such as a hard-disk embedded in a computer system.

In addition, the "computer readable storage medium" may include a medium for storing a program for a given length of time like a volatile memory (for example, a Dynamic Random Access Memory (DRAM)) embedded in a computer system, which is a server or client when a program is transmitted via a communication line such as a network including the Internet and a phone line. The above-described program may be transferred, from the computer system including the storage device storing this program, to another computer system, via a transmission medium, or by transmission waves in the transmission medium. The "transmission medium" that transmits the program means a medium having a function to transmit information, such as a network (communication net) like the Internet, or a communication line (communication wire) like a phone line like. The above-described program may be used to implement a part of the above-described functions. In addition, the above-described program may implement the above-described functions in cooperation with another program previously stored in the computer system, so-called difference file (difference program).

Although the foregoing has been a description of the embodiment of the present invention with reference to the drawings, the specific configuration of the present invention is not limited to the embodiments described above, and can be freely modified within the scope of the present invention.

What is claimed is:

1. A plant control device comprising:
at least one memory storing instructions, and
at least one processor configured to execute the instructions to:
register a simulated dangerous condition which is a simulated representation of an operation condition under which a numerical value index of a measured value of one or more devices provided in a plant is in a predetermined range, the simulated dangerous condition being set in advance;
acquire an operation condition of the plant;
learn the operation condition acquired and the simulated dangerous condition registered and produce an operation model of the plant;
determine an operation parameter of the plant on a basis of the operation condition acquired and the operation model produced; and
instruct an operation of the plant on a basis of the operation parameter determined,
wherein
the learning of the operation condition acquired and the simulated dangerous condition registered and the producing of the operation model comprise learning the operation condition acquired and the simulated dangerous condition registered as a loss function indicating nonconformity with the operation condition, associating the operation condition with the loss function, and producing the operation model to increase the loss function in the simulated dangerous condition learned, and
the determining of the operation parameter comprises calculating the loss function of the operation condition acquired and determining the operation parameter to reduce the loss function on a basis of the operation model produced.

2. The plant control device according to claim 1, wherein the at least one processor is configured to execute the instructions to instruct a device used to adjust the operation condition to operate the plant.

3. The plant control device according to claim 2, wherein the at least one processor is configured to execute the instructions to continuously perform the determination of the operation parameter and the instruction to the device to operate the plant.

4. The plant control device according to claim 1, wherein the at least one processor is configured to execute the instructions to instruct an operator who operates a device used to adjust the plant to operate the plant.

5. The plant control device according to claim 4, wherein the at least one processor is configured to execute the instructions to instruct the operator to operate the plant at the time of a predetermined timing.

6. The plant control device according to claim 1, wherein the at least one processor is configured to execute the instructions to:
acquire a target yield of the plant; and
determine the operation parameter to prevent the simulated dangerous condition on a basis of the operation model when the target yield acquired has been changed.

7. The plant control device according to claim 6, wherein the at least one processor is configured to execute the instructions to:
acquire a setting period of the target yield; and
determine the operation parameter on a basis of the target yield in the setting period acquired.

8. A plant control method comprising:
registering a simulated dangerous condition which is a simulated representation of an operation condition under which a numerical value index of a measured value of one or more devices provided in a plant is in a predetermined range, the simulated dangerous condition being set in advance;
acquiring an operation condition of the plant;
learning the operation condition acquired and the simulated dangerous condition registered and producing an operation model of the plant;
determining an operation parameter of the plant on a basis of the operation condition acquired and the operation model produced; and
instructing an operation of the plant on a basis of the operation parameter determined,
wherein
the learning of the operation condition acquired and the simulated dangerous condition registered and the producing of the operation model comprise learning the operation condition acquired and the simulated dangerous condition registered as a loss function indicating nonconformity with the operation condition, associating the operation condition with the loss function, and producing the operation model to increase the loss function in the simulated dangerous condition learned, and
the determining of the operation parameter comprises calculating the loss function of the operation condition acquired and determining the operation parameter to reduce the loss function on a basis of the operation model produced.

9. The plant control method according to claim 8, wherein the instructing of the operation of the plant includes instructing a device used to adjust the operation condition to operate the plant.

10. The plant control method according to claim 8, wherein
the instructing of the operation of the plant includes instructing an operator who operates a device used to adjust the plant to operate the plant.

11. The plant control method according to claim 8, further comprising:
acquiring a target yield of the plant,
wherein the determining of the operation parameter includes determining the operation parameter to prevent the simulated dangerous condition on a basis of the operation model when the target yield acquired has been changed.

12. The plant control method according to claim 11, further comprising:
acquiring a setting period of the target yield,
wherein the determining of the operation parameter includes determining the operation parameter on a basis of the target yield in the setting period acquired.

13. The plant control method according to claim 9, wherein
the determining of the operation parameter and the instructing of the operation of the plant to the device are continuously performed.

14. A non-transitory computer-readable storage medium storing a plant control program, which when executed by a computer, causes the computer to:
register a simulated dangerous condition which is a simulated representation of an operation condition under which a numerical value index of a measured value of one or more devices provided in a plant is in a predetermined range, the simulated dangerous condition being set in advance;
acquire an operation condition of the plant;
learn the operation condition acquired and the simulated dangerous condition registered and produce an operation model of the plant;
determine an operation parameter of the plant on a basis of the operation condition acquired and the operation model produced; and
instruct an operation of the plant on a basis of the operation parameter determined,
wherein
the learning of the operation condition acquired and the simulated dangerous condition registered and the producing of the operation model comprise learning the operation condition acquired and the simulated dangerous condition registered as a loss function indicating nonconformity with the operation condition, associating the operation condition with the loss function, and producing the operation model to increase the loss function in the simulated dangerous condition learned, and
the determining of the operation parameter comprises calculating the loss function of the operation condition acquired and determining the operation parameter to reduce the loss function on a basis of the operation model produced.

* * * * *